(12) United States Patent
Fukatsu et al.

(10) Patent No.: US 11,958,481 B2
(45) Date of Patent: Apr. 16, 2024

(54) SURROUNDING MOVING OBJECT DETECTOR

(71) Applicant: SUBARU CORPORATION, Tokyo (JP)

(72) Inventors: Yuuki Fukatsu, Tokyo (JP); Takumi Yonekura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 273 days.

(21) Appl. No.: 17/212,854

(22) Filed: Mar. 25, 2021

(65) Prior Publication Data
US 2021/0323548 A1  Oct. 21, 2021

(30) Foreign Application Priority Data

Apr. 20, 2020  (JP) ................................ 2020-074522
Jan. 27, 2021  (JP) ................................ 2021-011407

(51) Int. Cl.
*B60W 30/095* (2012.01)
*B60W 40/04* (2006.01)

(52) U.S. Cl.
CPC ........ *B60W 30/0956* (2013.01); *B60W 40/04* (2013.01); *B60W 2554/4041* (2020.02)

(58) Field of Classification Search
CPC .......... B60W 30/0956; B60W 30/095; B60W 40/04; B60W 2554/4041; H04B 17/203; H03J 2200/27
See application file for complete search history.

(56) References Cited

U.S. PATENT DOCUMENTS

| 2004/0090319 | A1* | 5/2004 | Kimura | B60T 7/22 701/1 |
| 2014/0292502 | A1* | 10/2014 | Sakima | B60W 30/0956 340/435 |

(Continued)

FOREIGN PATENT DOCUMENTS

| JP | 2011-218857 A | 11/2011 | |
| WO | WO-2016185653 A1 * | 11/2016 | B60R 21/00 |

OTHER PUBLICATIONS

Machine Translation of Hashimoto's reference (WO-2016185653-A1) (Year: 2016).*

*Primary Examiner* — Tarek Elarabi
(74) *Attorney, Agent, or Firm* — Rimon P.C.

(57) ABSTRACT

A surrounding moving object detector includes a vehicle traveling information acquiring unit, a contact detection unit, a surrounding object information acquiring unit, a traveling course prediction processor, a contact possibility calculation processor, and a determination threshold changing processor. The traveling course prediction processor predicts a future traveling course of an vehicle based on vehicle traveling information acquired by the vehicle traveling information acquiring unit and predicts a future traveling course of a moving object present around the vehicle based on the surrounding object information acquired by the surrounding object information acquiring unit. The contact possibility calculation processor calculates a possibility of contact by comparing the future traveling course of the vehicle and the future traveling course of the moving object. The determination threshold changing processor changes a determination threshold based on the possibility of contact. The contact detection unit detects the contact based on the determination threshold.

3 Claims, 7 Drawing Sheets

(56) References Cited

U.S. PATENT DOCUMENTS

| | | | | |
|---|---|---|---|---|
| 2018/0366001 A1* | 12/2018 | Matsunaga | ....... | B60W 30/0956 |
| 2019/0100196 A1* | 4/2019 | Ueda | ..................... | B60W 10/18 |
| 2020/0377053 A1* | 12/2020 | Umezawa | ........... | B60W 30/095 |
| 2021/0027629 A1* | 1/2021 | Tao | ........................ | G08G 1/166 |
| 2022/0073067 A1* | 3/2022 | Lee | ....................... | B60W 40/04 |

* cited by examiner

SURROUNDING MOVING OBJECT DETECTOR

CROSS-REFERENCE TO RELATED APPLICATIONS

The present application claims priority from Japanese Patent Application Nos. 2020-074522 filed on Apr. 20, 2020 and 2021-011407 filed on Jan. 27, 2021, the entire contents of each of which are hereby incorporated by reference.

BACKGROUND

The technology relates to a surrounding moving object detector.

Typical vehicles include a contact detector that activates internal and external air bags, for example. Further, a protection processor has been proposed in Japanese Unexamined Patent Application Publication No. 2011-218857, for example, that controls the external air bag by detecting a relative position (height of a contact position) of a pedestrian or a person riding on a two-wheel vehicle (hereinafter collectively referred to as a pedestrian or cyclist) moving around the vehicle.

The protection processor changes the unfolding angle θ of a main air bag provided on a front portion of the vehicle by using a sub-air bag on the basis of the height of a contact position and an estimated height of the center of gravity of the obstacle.

SUMMARY

An aspect of the technology provides a surrounding moving object detector for a vehicle. The detector includes a vehicle traveling information acquiring unit, a contact detection unit, a surrounding object information acquiring unit, a traveling course prediction processor, a contact possibility calculation processor, and a determination threshold changing processor. The vehicle traveling information acquiring unit is configured to acquire vehicle traveling information including data on a traveling position of the vehicle. The contact detection unit is configured to detect contact between the vehicle and a moving object present around the traveling position on the basis of a predetermined determination threshold. The surrounding object information acquiring unit is configured to acquire surrounding object information on objects present around the traveling position. The traveling course prediction processor is configured to predict a future traveling course of the vehicle on the basis of the vehicle traveling information and predict a future traveling course of the moving object present around the traveling position on the basis of the surrounding object information. The contact possibility calculation processor is configured to calculate a possibility of the contact between the vehicle and the moving object by comparing the future traveling course of the vehicle predicted by the traveling course prediction processor and the future traveling course of the moving object predicted by the traveling course prediction processor. The determination threshold changing processor is configured to change the predetermined determination threshold on the basis of the possibility of the contact calculated by the contact possibility calculation processor.

An aspect of the technology provides a surrounding moving object detector for a vehicle. The detector includes circuitry. The circuitry is configured to acquire vehicle traveling information including data on a traveling position of a vehicle. The circuitry is configured to acquire contact information on contact between the vehicle and a moving object present around the traveling position on the basis of a predetermined determination threshold. The circuitry is configured to acquire surrounding object information on objects present around the traveling position. The circuitry is configured to predict a future traveling course of the vehicle on the basis of the vehicle traveling information and predict a future traveling course of the moving object present around the traveling position on the basis of the surrounding object information; calculate a possibility of the contact between the vehicle and the moving object by comparing the future traveling course of the vehicle and the future traveling course of the moving object; and change the predetermined determination threshold on the basis of the possibility of the contact.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

When a vehicle is turning right or left, for example, there is a possibility of contact between a pedestrian or cyclist and a side face, rather than a front face, of the vehicle. In a case where a pedestrian or cyclist contacts the side face of a typical vehicle, the typical vehicle can find it difficult to sufficiently protect the pedestrian or cyclist from the damage caused by the contact.

Further, the side face of the vehicle is more likely to come closer to an obstacle than the front face of the vehicle is. Even if a moving object detector in the protection processor has detected a pedestrian or cyclist once, the pedestrian or cyclist often disappears from sight by being hidden by the obstacle after the detection.

Contact between the pedestrian or cyclist and the side face or rear face of the vehicle can be detected by an existing occupant protection air bag sensor, for example. Such an existing occupant protection air bag sensor determines an occurrence of contact using a detection threshold. However, the detection threshold has been used assuming contact between vehicles and is thus too high to detect contact between a vehicle and a pedestrian or cyclist. Thus, the existing occupant protection air bag sensor needs to lower the detection threshold in order to detect contact between a vehicle and a pedestrian or cyclist. Unfortunately, lowering the detection threshold can cause the existing occupant protection air bag sensor to erroneously detect contact when not needed.

It is desirable to provide a surrounding moving object detector that helps reduce erroneous detection of contact between different types of objects, such as between a vehicle and a pedestrian or a cyclist.

Some example embodiments of the technology will now be described with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description. In the following example embodiment, a contact detection notification apparatus is described which includes a surrounding moving object detector mounted on a vehicle.

Figure 1:
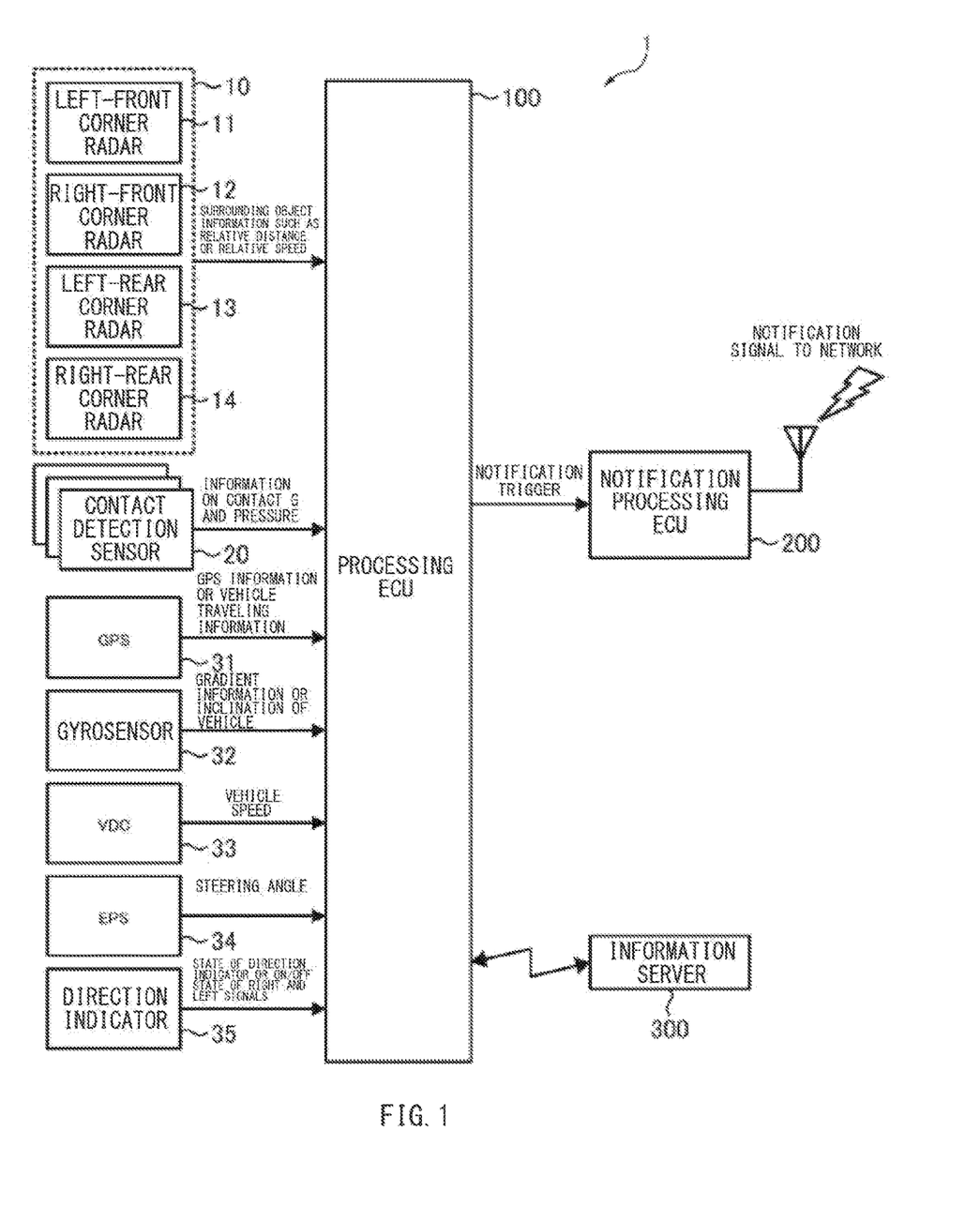
FIG. 1 is a schematic block diagram of an exemplary configuration of a contact detection notification apparatus provided with a surrounding moving object detector according to one example embodiment of the technology.

FIG. 1 is a schematic block diagram illustrating an exemplary configuration of a contact detection notification apparatus 1 including a surrounding moving object detector according to one example embodiment of the technology. FIG. is a flowchart of a contact possibility calculation procedure performed by the contact detection notification apparatus 1 according to the example embodiment of the technology. FIG. 3 is a flowchart of a post-detection time-to-contact (TTC) calculation process performed in the contact possibility calculation procedure. FIG. 4 is a flowchart of a TTC estimation process performed in the contact possibility calculation procedure.

[Exemplary Configuration of Contact Detection Notification Apparatus 1]

With reference to FIG. 1, the contact detection notification apparatus 1 may include an object detection radar 10, a contact detection sensor 20, a GPS 31, a gyrosensor 32, a vehicle dynamic controller (VDC) 33, an electric power steering system (EPS) 34, a direction indicator 35, a processing electronic control unit (ECU) 100, and a notification processing ECU 200.

[Object Detection Radar 10]

The object detection radar 10 acquires surrounding object information on objects present around the traveling position of the vehicle. For example, the object detection radar 10 may detect a relative distance or a relative position between the vehicle and a pedestrian or cyclist present around the vehicle. The object detection radar 10 may emit electric waves to detect a surrounding object such as an obstacle, a pedestrian, or a cyclist, and measure the distance or azimuth to the detected surrounding object. The object detection radar 10 may be mounted on the front bumper or the rear bumper of the vehicle to monitor front, side, and rear environments, for example.

Figure 7:
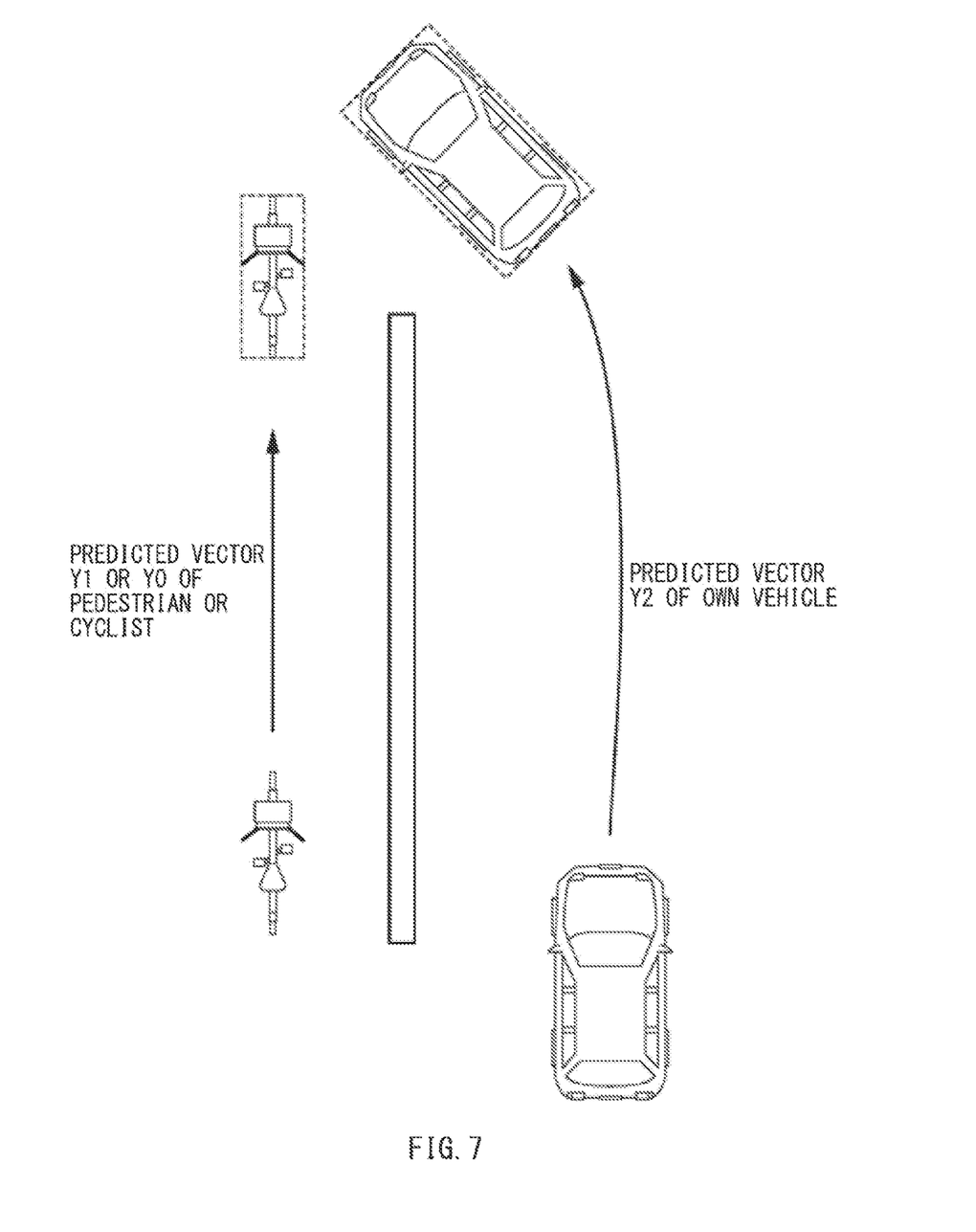
FIG. 7 is a conceptual diagram of a predicted vector of a pedestrian or cyclist, a predicted vector of a vehicle, and a time-to-contact (TTC).

Note that exemplary positions of the vehicle and the pedestrian or cyclist are illustrated in FIG. 7.

The object detection radar 10 may include a left-front corner radar 11, a right-front corner radar 12, a left-rear corner radar 13, and a right-rear corner radar 14.

The left-front corner radar 11 may be provided on a left front portion of the vehicle. The left-front corner radar 11 may detect a surrounding object present on a left front side of the vehicle, i.e., within a range extending from in front of the vehicle to the left side of the vehicle.

The right-front corner radar 12 may be provided on a right front portion of the vehicle. The right-front corner radar 12 may detect a surrounding object present on a right front side of the vehicle, i.e., within a range extending from in front of the vehicle to the right side of the vehicle.

The left-rear corner radar 13 may be provided on a left rear portion of the vehicle. The left-rear corner radar 13 may detect a surrounding object present on a left rear side of the vehicle, i.e., within a range extending from behind the vehicle to the left side of the vehicle.

The right-rear corner radar 14 may be provided on a right rear portion of the vehicle. The right-rear corner radar 14 may detect a surrounding object present on a right rear side of the vehicle, i.e., within a range extending from behind the vehicle to the right side of the vehicle.

[Contact Detection Sensor 20]

The contact detection sensor 20 may sense contact of the vehicle with the surrounding object. For example, the contact detection sensor 20 may detect a contact acceleration rate (contact G) and a pressure upon the contact between the surrounding object and the vehicle, for example.

The contact detection sensor 20 may include a contact G sensor that detects the contact G, and a pressure sensor that acquires data on the pressure, for example. The contact detection sensor 20 may further include a sensor that acquires information necessary to predict contact, such as a vehicle G sensor that detects an acceleration/deceleration rate of the vehicle.

[GPS 31]

The GPS 31 may acquire GPS information. The GPS information may include data on position of the vehicle (hereinafter referred to as vehicle position data). The GPS 31 may receive signals from several satellites in the sky to detect the vehicle position. The processing ECU 100 may retrieve information on geography (hereinafter referred to as surrounding geographical information) around the vehicle position from an information server 300 on the basis of the vehicle position data acquired by the GPS 31, which will be described later. Alternatively, the surrounding geographical information on the geography around the vehicle position may be retrieved from the surrounding geographical information preliminarily stored in a storage area of the processing ECU 100 on the basis of the vehicle position data included in the GPS information acquired.

[Gyrosensor 32]

The gyrosensor 32 may acquire an inclination of the vehicle. For example, the gyrosensor 32 may acquire inclination information on the vehicle by detecting an angular speed.

[VDC 33]

The VDC 33 may ensure the running stability of the vehicle at the time of cornering by acquiring the vehicle speed of the vehicle and preventing the vehicle from causing side slipping on the basis of information including the acquired vehicle speed.

[EPS 34]

The EPS 34 may acquire the angle of a steering wheel (steering angle). For example, the EPS 34 may use electricity (an electric motor) to assist the steering power.

[Direction Indicator 35]

The direction indicator 35 may notify other vehicles or persons present around the vehicle of the traveling direction of the vehicle when the vehicle is turning right or left or changing the traveling direction from one to another.

[Processing ECU 100]

The processing ECU 100 may detect the surrounding object moving around the vehicle. The processing ECU 100 may assess the possibility of contact between the vehicle and the surrounding object, and sent a notification trigger to the notification processing ECU 200 on the basis of the result of the assessment.

The processing ECU 100 may include a CPU, a ROM, a RAM, an electrically erasable programmable read-only memory (EEPROM) that includes a rewritable non-volatile memory, and an input/output interface circuit. The processing ECU 100 may comprehensively control the contact detection notification apparatus 1.

Further, the processing ECU 100 may be coupled to the object detection radar 10, the contact detection sensor 20, the GPS 31, the gyrosensor 32, the VDC 33, the EPS 34, the direction indicator 35, and the notification processing ECU 200 via the input/output interface circuit.

The processing ECU 100 may acquire the surrounding object information from the object detection radar 10. The processing ECU 100 may assess the possibility of contact between the vehicle and the surrounding object on the basis of the vehicle position received from the GPS 31, the vehicle speed received from the VDC 33, the steering angle received from the EPS 34, and the state of the direction indicator received from the direction indicator 35. If there is the possibility of contact between the vehicle and the surrounding object, the processing ECU 100 may output the notification trigger to the notification processing ECU 200.

[Notification Processing ECU 200]

In a case where there is the possibility of contact between the vehicle and the surrounding object, the notification processing ECU 200 may send a notification signal to a network. For example, the notification processing ECU 200 may send the notification signal to the network when receiving the notification trigger from the processing ECU 100. Optionally, the notification processing ECU 200 may notify the driver or occupant in the vehicle of the possibility of contact between the vehicle and the surrounding object, if needed.

[Exemplary Operation of Contact Detection Notification Apparatus 1]

An exemplary operation of the contact detection notification apparatus 1 will now be described.

Figure 2:
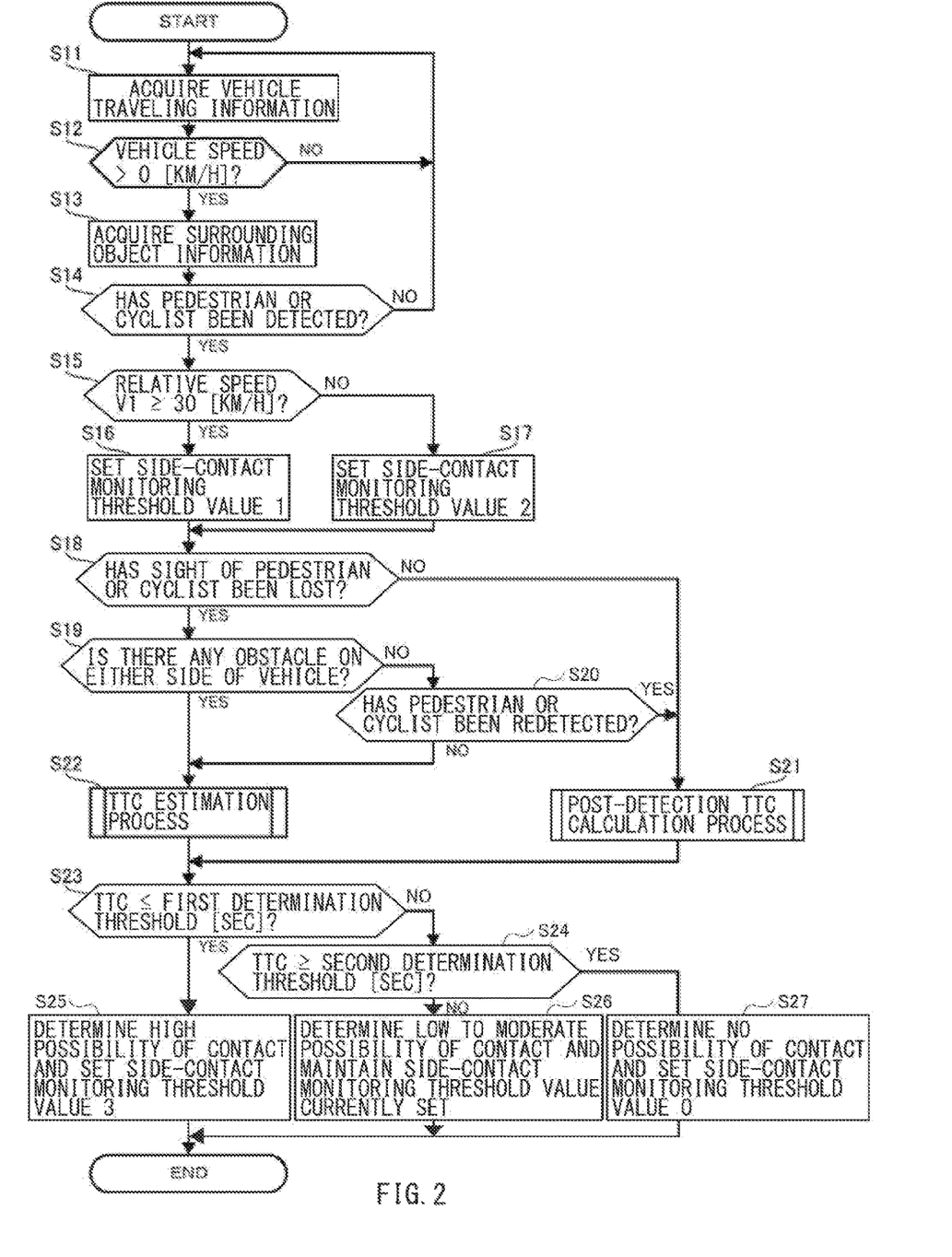
FIG. 2 is a flowchart of a contact possibility calculation procedure performed by the contact detection notification apparatus according to one example embodiment of the technology.
Figure 3:
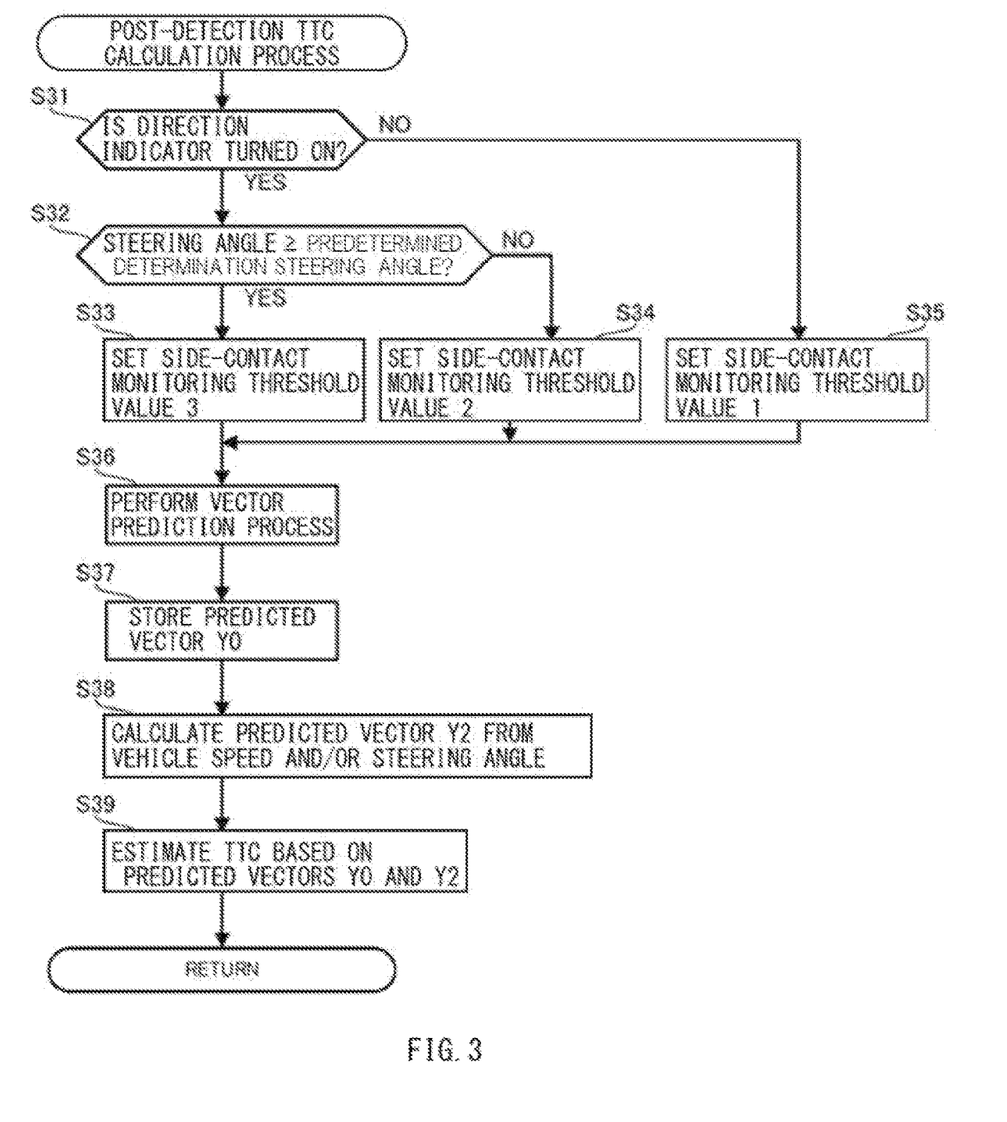
FIG. 3 is a flowchart of a post-detection time-to-contact calculation process performed in the contact possibility calculation procedure.
Figure 4:
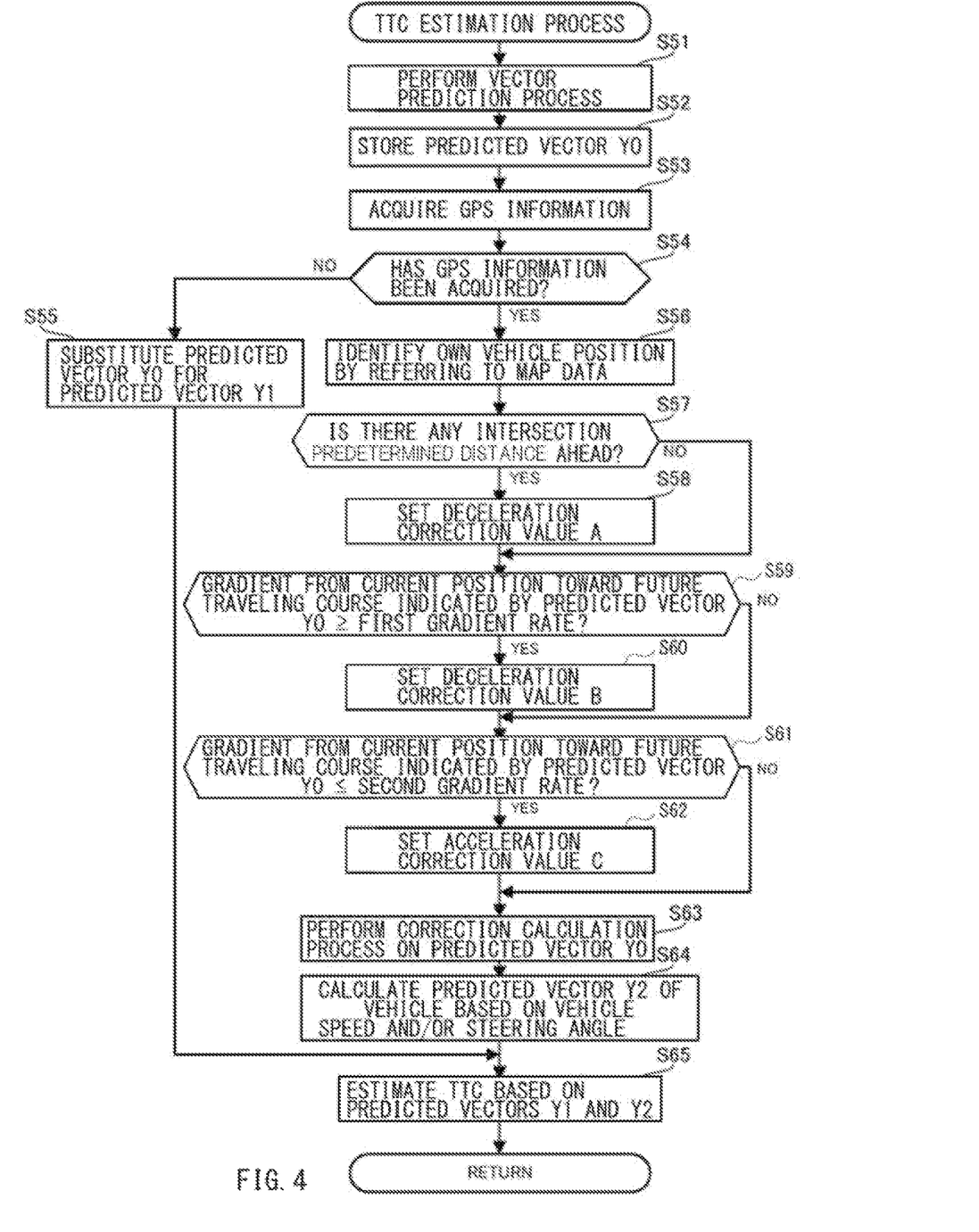
FIG. 4 is a flowchart of a time-to-contact estimation process performed in the contact possibility calculation procedure.

FIGS. 2 to 4 are flowcharts illustrating a contact possibility calculation procedure performed by the contact detection notification apparatus 1. The contact possibility calculation procedure may include a process of detecting a surrounding object present around the vehicle.

The contact detection notification apparatus 1 may include the processing ECU 100. The processing ECU 100 may periodically perform the contact possibility calculation procedure illustrated in FIGS. 2 to 5 at a predetermined cycle. The contact possibility calculation procedure may be performed in response to a predetermined detection signal.

The contact possibility calculation procedure may start with Step S11 in which the processing ECU 100 acquires information on the vehicle (hereinafter referred to as vehicle traveling information). For example, the processing ECU 100 may acquire the vehicle speed from the VDC 33.

Thereafter, the processing ECU 100 may determine whether the vehicle speed is greater than 0 [km/h] (Step S12). That is, the processing ECU 100 may determine whether the vehicle is moving forward.

Alternatively, the processing ECU 100 may determine whether the vehicle speed is equal to 0 [km/h] in Step S12. That is, the processing ECU 100 may determine whether the vehicle is stopping. Also in the case where the vehicle speed is less than 0 [km/h], i.e., when the vehicle is moving backward, a process of changing a threshold, which will be described later, may be performed.

If it is determined that the vehicle speed is greater than 0 [km/h] (Step S12: YES), the processing ECU 100 may cause the process to proceed to Step S13. If it is determined that the vehicle speed is equal to or less than 0 [km/h] (Step S12: NO), the processing ECU 100 may cause the process to return to Step S11.

If it is determined that the vehicle speed is greater than 0 [km/h] (Step S12: YES), the processing ECU 100 may perform a process of acquiring the surrounding object information (Step S13). For example, the processing ECU 100 may acquire the surrounding object information obtained by the object detection radar 10.

Thereafter, the processing ECU 100 may determine whether a pedestrian or cyclist has been detected around the vehicle on the basis of the surrounding object information (Step S14). In this step, the processing ECU 100 may tentatively determine whether the pedestrian or cyclist has been detected. That is, the processing ECU 100 may detect any surrounding object moving around the vehicle on the basis of the relative speed between the vehicle and the surrounding object, and if the surrounding object is detected, the processing ECU 100 may tentatively detect the surrounding object as a pedestrian or cyclist. In this example embodiment, examples of the pedestrian or cyclist may include a pedestrian, a person riding on a bicycle, and an occupant in a two-wheel vehicle.

If it is determined that the pedestrian or cyclist has been detected (Step S14: YES), the processing ECU 100 may cause the process to proceed to Step S15. In contrast, if it is not determined that the pedestrian or cyclist has been detected (Step S14: NO), the processing ECU 100 may cause the process to return to Step S11.

If it is determined that the pedestrian or cyclist has been detected (Step S14: YES), the processing ECU 100 may determine whether a relative speed V1 between the vehicle and the pedestrian or cyclist is greater than or equal to 30 [km/h] (Step S15). If the relative speed V1 between the vehicle and the pedestrian or cyclist is less than 30 [km/h] (Step S15: NO), it may be presumed that the pedestrian or cyclist is traveling side by side with the vehicle, and it may be determined that there is a high possibility of contact between the pedestrian or cyclist and the vehicle.

If it is determined that the relative speed V1 is greater than or equal to 30 [km/h] (Step S15: YES), the processing ECU 100 may cause the process to proceed to Step S16. In contrast, if it is not determined that the relative speed V1 is greater than or equal to 30 [km/h], i.e., if it is determined that the relative speed V1 is less than 30 [km/h] (Step S15: NO), the processing ECU 100 may cause the process to proceed to Step S17.

If it is determined that the relative speed V1 is greater than or equal to 30 [km/h] (Step S15: YES), the processing ECU 100 may set a side-contact monitoring threshold value "1" as a target threshold flag (Step S16). Note that the target threshold flag may be "0" in an initial state or at the start of the contact possibility calculation procedure.

Herein, the target threshold flag may be used to determine which threshold among a plurality of thresholds is to be employed to the detection of contact between the vehicle and the surrounding object present around the vehicle by the contact detection sensor 20. That is, the target threshold flag may be used to determine at which level the occurrence of contact should be detected. In this example embodiment, a determination threshold having four levels may be used, as illustrated in FIG. 5 described below, and the target threshold flag may determine which level of the determination threshold among the four levels is to be employed to determine an occurrence of contact.

Figure 5:
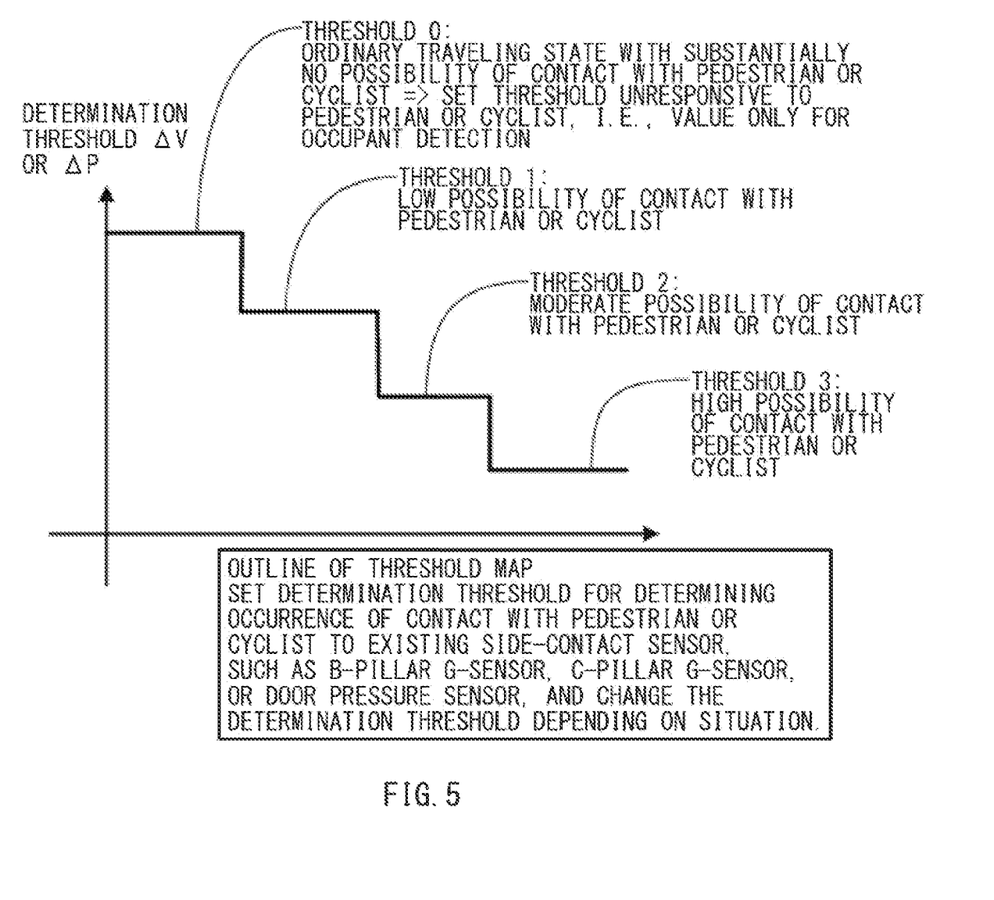
FIG. 5 is a conceptual diagram of a determination threshold according to one example embodiment of the technology.

FIG. 5 is a conceptual diagram of the determination threshold that varies depending on the side-contact monitoring threshold values. As illustrated in FIG. 5, the determination threshold used by the sensors to detect contact may change stepwise depending on which side-contact monitoring threshold value is set.

For example, the side-contact monitoring threshold values may include four-step values: an initial side-contact monitoring threshold value "0", a side-contact monitoring threshold "1", a side-contact monitoring threshold "2", and a side-contact monitoring threshold "3". The determination threshold, which is used to determine whether the value detected by the contact detection sensor 20 corresponds to contact, may change depending on which side-contact monitoring threshold value is set. As the side-contact monitoring threshold value increases from "1" to "2", for example, the value of the determination threshold may decrease. As the value of the determination threshold decreases, a smaller impact may be determined as contact. The contact detection may exhibit the highest sensitivity at the side-contact monitoring threshold value "3".

If the relative speed V1 is greater than or equal to 30 [km/h] (Step S15: YES), it may be predicted that there is a low possibility of contact between the vehicle and the pedestrian or cyclist. However, since the pedestrian or cyclist has been detected near the vehicle, the sensitivity of the contact detection may be increased from the initial sensitivity by increasing the side-contact monitoring threshold value by one step, from the initial side-contact monitoring threshold value "0" to the side-contact monitoring threshold value "1" (i.e., decreasing the value of the determination threshold). This allows the contact detection sensor 20 to detect a smaller detection value as contact between the vehicle and a surrounding object with higher sensitivity than the initial sensitivity.

In contrast, if it is determined that the relative speed V1 is less than 30 [km/h] (Step S15: NO), the processing ECU 100 may set the side-contact monitoring threshold value "2" as the target threshold flag (Step S17).

For example, if the relative speed V1 is less than 30 [km/h], it may be presumed that the pedestrian or cyclist is traveling side by side with the vehicle. Thus, the possibility of contact become higher than that determined when the relative speed V1 is greater than or equal to 30 [km/h]. Accordingly, higher sensitivity of the contact detection may be set by increasing the side-contact monitoring threshold value by one step, i.e., from the side-contact monitoring threshold value "1", which is set when the relative speed V1 is greater than or equal to 30 [km/h], to the side-contact monitoring threshold value "2".

After setting the side-contact monitoring threshold value (Step S16 or S17), the processing ECU 100 may determine whether the sight of the pedestrian or cyclist has been lost (Step S18). That is, the processing ECU 100 may determine whether the pedestrian or cyclist has been detected without losing sight of the detected pedestrian or cyclist.

If it is determined that the sight of the pedestrian or cyclist has been lost (Step S18: YES), the processing ECU 100 may cause the process to proceed to Step S19. In contrast, if it is not determined that the sight of the pedestrian or cyclist has been lost (Step S18: NO), the processing ECU 100 may cause the process to proceed to Step S21.

If it is determined that the sight of the pedestrian or cyclist has been lost (Step S18: YES), the processing ECU 100 may determine whether there is an obstacle on either side of the vehicle (Step S19). In this example embodiment, the processing ECU 100 may identify a static surrounding object as an obstacle. The processing ECU 100 may determine whether the surrounding object is a static obstacle on the basis of the vehicle speed and the relative speed between the vehicle and the surrounding object.

If it is determined that there is an obstacle on either side of the vehicle (Step S19: YES), the processing ECU 100 may cause the process to proceed to Step S22. In contrast, if it is determined that there is no obstacle on either side of the vehicle (Step S19: NO), the processing ECU 100 may cause the process to proceed to Step S20.

If it is determined that there is no obstacle on either side of the vehicle (Step S19: NO), the processing ECU 100 may redetect a pedestrian or cyclist, and determines whether the pedestrian or cyclist has been redetected (Step S20).

If it is determined that the pedestrian or cyclist has been redetected (Step S20: YES), the processing ECU 100 may cause the process to proceed to Step S21. In contrast, if it is not determined that the pedestrian or cyclist has been redetected (Step S20: NO), the processing ECU 100 may cause the process to proceed to Step S22.

If it is not determined that the sight of the pedestrian or cyclist has been lost (Step S18: NO) or if it is determined that the pedestrian or cyclist has been redetected (Step S20: YES), the processing ECU 100 may perform the post-detection TTC calculation process (Step S21).

In the post-detection TTC calculation process, the processing ECU 100 may predict future traveling courses of the vehicle and the detected pedestrian or cyclist on the basis of operational information on the vehicle and information on the detected pedestrian or cyclist. The processing ECU 100 may compare the future traveling course of the vehicle and the future traveling course of the pedestrian or cyclist to assess the possibility of contact between the vehicle and the pedestrian or cyclist, and calculate a time-to-contact (TTC), which is an estimated time until the vehicle contacts the pedestrian or cyclist. For example, the processing ECU 100 may determine whether the vehicle will turn right or left on the basis of a vehicle signal, such as the state of the direction indicator 35 or the steering angle. If it is determined that the vehicle will change its traveling direction, the processing ECU 100 may determine that there is a high possibility of contact between the vehicle and the pedestrian or cyclist, and lower the determination threshold so that contact on the side face of the vehicle is more easily detected. The post-detection TTC calculation process will be described in detail later.

In contrast, if it is determined that there is an obstacle on either side of the vehicle (Step S19: YES) or if it is not determined that the pedestrian or cyclist has been redetected (Step S20: NO), the processing ECU 100 may perform the TTC estimation process (Step S22).

In the TTC estimation process, the processing ECU 100 may predict a future traveling course of the pedestrian or cyclist on the basis of a previous traveling state of the pedestrian or cyclist immediately before the sight of the pedestrian or cyclist is lost. In the TTC estimation process, the processing ECU 100 may further correct the future traveling course of the pedestrian or cyclist on the basis of the surrounding geographical information. Further, the processing ECU 100 may predict a future traveling course of the vehicle on the basis of the vehicle speed and the operational information on the vehicle, such as the steering angle. The processing ECU 100 may then compare the future traveling course of the pedestrian or cyclist with the future traveling course of the vehicle to assess the possibility of contact between the pedestrian or cyclist and the vehicle, and calculate the TTC. The TTC estimation process will be described in detail later.

When the post-detection TTC calculation process (Step S21) or the TTC estimation process (Step S22) is completed, the processing ECU 100 may determine whether the TTC is less than or equal to a first determination threshold having a predetermined value (Step S23). Herein, the first determination threshold may be a predetermined time used to determine whether the time interval to the TTC is short and whether there is a high possibility of contact between the vehicle and the pedestrian or cyclist.

Note that the processing ECU 100 may assess the possibility of contact on the basis of the TTC calculated through the processes in Steps S23 and Step S24. That is, the processing ECU 100 may determine that it is more difficult to avoid the contact as the TTC becomes shorter, and set a determination threshold with which the contact is more easily detected.

If it is determined that the TTC is less than or equal to the first determination threshold (Step S23: YES), the processing ECU 100 may cause the process to proceed to Step S25. In contrast, if it is determined that the TTC is greater than the first determination threshold (Step S23: NO), the processing ECU 100 may cause the process to proceed to Step S24.

If it is determined that the TTC is greater than the first determination threshold (Step S23: NO), the processing ECU 100 may determine whether the TTC is greater than or equal to a second determination threshold having a predetermined value (Step S24). Herein, the second determination threshold may be a predetermined time used to determine whether the time interval to the TTC is long and whether there is no or substantially no possibility of contact between the vehicle and the pedestrian or cyclist. Thus, the second determination threshold may be greater (i.e., a longer time) than the first determination threshold.

If it is determined that the TTC is greater than or equal to the second determination threshold (Step S24: YES), the processing ECU 100 may cause the process to proceed to Step S27. In contrast, if it is determined that the TTC is less than the TTC (Step S24: NO), the processing ECU 100 may cause the process to proceed to Step S26.

If it is determined that the TTC is less than or equal to the first determination threshold (Step S23: YES), the processing ECU 100 may set the side-contact monitoring threshold value of "3" as the target threshold flag (Step S25), and end the contact possibility calculation procedure.

For example, if it is determined that the TTC is less than or equal to the first determination threshold, the processing ECU 100 may determine that there is a high possibility of contact between the vehicle and the pedestrian or cyclist, and set the highest detection sensitivity by setting the highest side-contact monitoring threshold value "3" having the lowest value.

In contrast, if it is not determined that the TTC is greater than or equal to the second determination threshold, i.e., if it is determined that the TTC is greater than the first determination threshold (Step S23: NO) and less than the second threshold (Step S24: NO), the processing ECU 100 may maintain the side-contact monitoring threshold value currently set (Step S26) and end the contact possibility calculation procedure.

For example, if it is determined that the TTC is greater than the first determination threshold (Step S23: NO) and less than the second determination threshold (Step S24: NO), it may be determined that there is a low to moderate possibility of contact between the vehicle and the pedestrian or cyclist, and the side-contact monitoring threshold value currently set may be maintained on the basis of the contact possibility.

If it is determined that the TTC is greater than or equal to the second determination threshold (Step S24: YES), the processing ECU 100 may set the side-contact monitoring threshold value "0" as the target threshold flag (Step S27), and end the contact possibility calculation procedure.

For example, if the TTC is greater than or equal to the second determination threshold (Step S24: YES), the processing ECU 100 may determine that there is no or substantially no possibility of contact between the vehicle and the pedestrian or cyclist, and reset the level of the determination threshold currently set to the level of the determination threshold for ordinary traveling by setting the side-contact monitoring threshold value "0".

[Post-Detection TTC Calculation Process]

With reference to FIG. 3, the post-detection TTC calculation process performed in Step S21 of FIG. 2 will now be described in detail. FIG. 3 illustrates a subroutine of the post-detection TTC calculation process.

The post-detection TTC calculation process may start with Step S31 in which the processing ECU 100 determines whether the direction indicator 35 is turned on. For example, the processing ECU 100 may determine whether either one of the right and left signals of the direction indicator 35 is turned on or both of the right and left signals of the direction indicator 35 are turned off.

Thereafter, if it is determined that the direction indicator 35 is turned on (Step S31: YES), the processing ECU 100 may cause the process to proceed to Step S32. In contrast, if it is not determined that the direction indicator 35 is turned on (Step S31: NO), the processing ECU 100 may cause the process to proceed to Step S35.

If it is determined that the direction indicator 35 is turned on (Step S31: YES), the processing ECU 100 may determine whether the steering angle is greater than or equal to a predetermined determination steering angle (Step S32). For example, the processing ECU 100 may determine whether the steering angle acquired from the EPS 34 is greater than or equal to the predetermined determination steering angle.

If it is determined that the steering angle is greater than or equal to the predetermined determination steering angle (Step S32: YES), the processing ECU 100 may cause the process to proceed to Step S33. In contrast, if it is determined that the steering angle is less than the predetermined determination steering angle (Step S32: NO), the processing ECU 100 may cause the process to proceed to Step S34.

If it is determined that the steering angle is greater than or equal to the predetermined determination steering angle (Step S32: YES), the processing ECU 100 may set the side-contact monitoring threshold value "3" (Step S33) as the target threshold flag, and cause the process to proceed to Step S36.

For example, if the steering angle is greater than or equal to the predetermined determination steering angle (Step S32: YES), the processing ECU 100 may determine that there is a high possibility of contact between the vehicle and the pedestrian or cyclist, and set the highest detection sensitivity by setting the highest side-contact monitoring threshold value "3" having the lowest value.

In contrast, if it is determined that the steering angle is less than the predetermined determination steering angle (Step S32: NO), the processing ECU 100 may set the side-contact monitoring threshold value "2" as the target threshold flag (Step S34), and cause the process to proceed to Step S36.

For example, if the steering angle is less than the predetermined determination steering angle (Step S32: NO), the processing ECU 100 may determine that the possibility of contact between the vehicle and the pedestrian or cyclist is lower than that determined when the steering angle is greater than or equal to the predetermined determination steering angle. Thus, the processing ECU 100 may set the side-contact monitoring threshold value which provides lower detection sensitivity than the side-contact monitoring threshold value set when the steering angle is greater than or equal to the predetermined determination steering angle.

If it is not determined that the direction indicator 35 is turned on (Step S31: NO), the processing ECU 100 may set the side-contact monitoring threshold value "1" as the target threshold flag (Step S35), and cause the process to proceed to Step S36. For example, if it is not determined that the direction indicator 35 is turned on, the processing ECU 100 may determine that there is a further lower possibility of contact between the vehicle and the pedestrian or cyclist, and set the side-contact monitoring threshold value which provides lower detection sensitivity than the side-contact monitoring threshold value set when the direction indicator 35 is tuned on.

After setting the side-contact monitoring threshold value (Step S33, S34, or S35), the processing ECU 100 may perform a vector prediction process (Step S36). In the vector prediction process, a predicted vector indicating a future traveling course of the target pedestrian or cyclist (hereinafter referred to as a predicted vector Y0) may be calculated on the basis of the traveling state of the target pedestrian or cyclist acquired up to the present (i.e., the past traveling state including speed vectors obtained in n-time detections) without taking into consideration of the surrounding environment.

Figure 6:
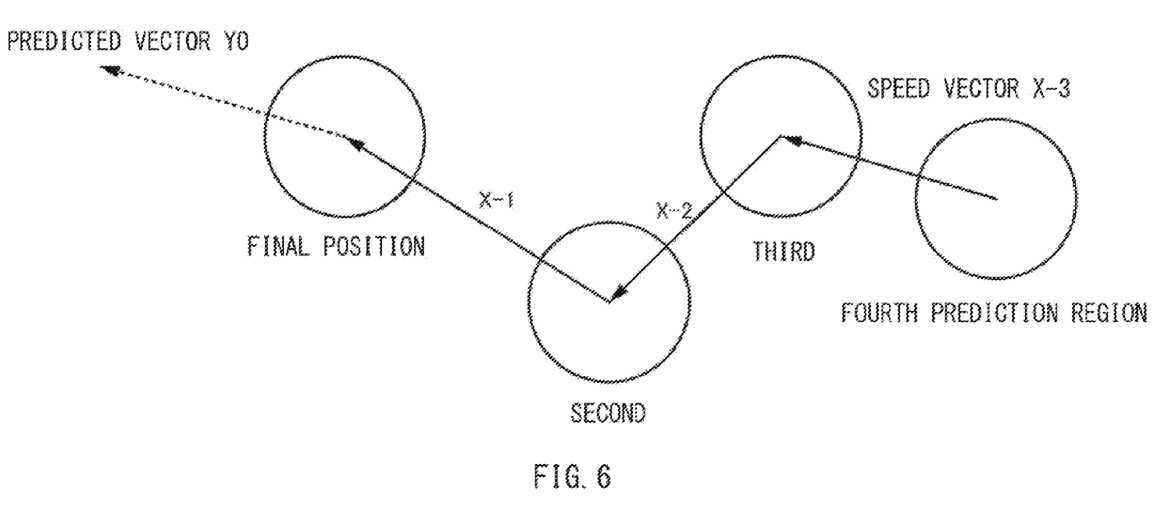
FIG. 6 is a conceptual diagram of vector prediction according to one example embodiment of the technology.

FIG. 6 is a conceptual diagram of the vector prediction.

In the vector prediction illustrated in FIG. 6, the predicted vector Y0 indicating the future traveling course of the target pedestrian or cyclist may be obtained by calculating an average value among speed vectors X-1, X-2, and X3 of the target pedestrian or cyclist. The speed vector X1 may be a speed vector of the pedestrian or cyclist at a predetermined time before the current time point. The speed vector X-2 may be a speed vector of the pedestrian or cyclist at a time point before the time point when the speed vector X-1 was detected. The speed vector X-3 may be a speed vector of the pedestrian or cyclist at a time point before the time point when the speed vector X-2 was detected. Instead of simply calculating the average value, a predetermined weighting process may be performed on these speed vectors.

After performing the vector prediction, the processing ECU 100 may store the predicted vector Y0 of the pedestrian or cyclist (Step S37). For example, the processing ECU 100 may store the calculated predicted vector Y0 in a storage area of the RAM allocated to the predicted vector Y0.

Thereafter, the processing ECU 100 may calculate a predicted vector Y2 indicating a future traveling course of the vehicle from the vehicle traveling information (Step S38). For example, the processing ECU 100 may calculate the predicted vector Y2 from the vehicle speed received from the VDC 33 and/or the steering angle received from the EPS 34.

Thereafter, the processing ECU 100 may estimate the TTC on the basis of the predicted vector Y0 of the pedestrian or cyclist and the predicted vector Y2 of the vehicle (Step S39) and end the post-detection TTC calculation process.

FIG. 7 is a conceptual diagram of the predicted vectors Y0 and Y1 of the pedestrian or cyclist, the predicted vector Y2 of the vehicle, and the TTC. The predicted vector Y1 may be obtained by correcting the predicted vector Y0, which will be described in detail later.

As illustrated in FIG. 7, the TTC, which an estimated time until the vehicle contacts the pedestrian or cyclist, may be calculated on the basis of the predicted vectors Y0 and Y1 indicating the future traveling course of the pedestrian or cyclist and the predicted vector Y2 indicating the future traveling course of the vehicle.

[TTC Estimation Process]

With reference to FIG. 4, the TTC estimation process performed in Step S22 of FIG. 2 will now be described in detail. FIG. 4 illustrates a subroutine of the TTC estimation process.

The TTC estimation process may start with Step S51 in which the processing ECU 100 performs a vector prediction process. The vector prediction process may be the same as the vector prediction process performed in Step S36 of the post-detection TTC calculation process. That is, in the vector prediction process, the predicted vector Y0 indicating the future traveling course of the detected pedestrian or cyclist may be obtained on the basis of the traveling state of the target pedestrian or cyclist up to the present.

After performing the vector prediction, the processing ECU 100 may store the predicted vector Y0 of the pedestrian or cyclist (Step S52). For example, the processing ECU 100 may store the calculated predicted vector Y0 in the storage area of the RAM allocated to the predicted vector Y0.

Thereafter, the processing ECU 100 may acquire GPS information (Step S53). For example, the processing ECU 100 may receive the vehicle position data from the GPS 31. Further, the processing ECU 100 may receive the surrounding geographical information on the geography around the vehicle position from the information server 300 on the basis of the vehicle traveling information received. After receiving these pieces of GPS information, the processing ECU 100 may identify the vehicle position on the basis of the GPS information, and detect the presence of an intersection or a gradient road near the vehicle on the basis of the vehicle position. As described above, the surrounding geographical information may be preliminarily stored in the processing ECU 100, and retrieved from the processing ECU 100 on the basis of the vehicle position data in the GPS information.

Thereafter, the processing ECU 100 may determine whether the GPS information has been acquired (Step S54). For example, the processing ECU 100 may determine whether the vehicle position data and, if necessary, the surrounding geographical information have been acquired from the GPS 31.

If it is determined that the GPS information has been acquired (Step S54: YES), the processing ECU 100 may cause the process to proceed to Step S56. In contrast, if it is determined that no GPS information has been acquired (Step S54: NO), the processing ECU 100 may cause the process to proceed to Step S55.

If it is determined that no GPS information has been acquired (Step S54: NO), the processing ECU 100 may substitute the predicted vector Y0 for the predicted vector Y1 (Step S55), and cause the process to proceed to Step S65.

The predicted vector Y1 may indicate the future traveling course of the pedestrian or cyclist. The predicted vector Y1 may be obtained by correcting the predicted vector Y0, which is obtained on the basis of the past traveling state, using the surrounding geographical information. Thus, in a case where no surrounding geographical information has been acquired, the predicted vector Y0, which is obtained on the basis of the past traveling state, may be used as the predicted vector Y1 indicating the future traveling course of the pedestrian or cyclist after the correction.

In contrast, if it is determined that the GPS information has been acquired (Step S54: YES), the processing ECU 100 may identify the vehicle position by referring to map data (Step S56).

For example, the processing ECU 100 may identify the vehicle position on the map data on the basis of the vehicle position data (on the latitude and longitude) received from the GPS 31. For instance, the processing ECU 100 may identify the road on which the vehicle is traveling and the vehicle position on the map data. Identifying the vehicle position may identify the presence of the pedestrian or cyclist near the vehicle on the same road because it is presumed that the detected pedestrian or cyclist is traveling side by side with the vehicle.

Thereafter, the processing ECU 100 may determine whether there is any intersection within a predetermined distance from the current vehicle position (Step S57). The predetermined distance may be several tens of meters, for example. For instance, the processing ECU 100 may determine whether there is any intersection within the predetermined distance from the current vehicle position by referring to the surrounding geographical information.

If it is determined that there is an intersection within the predetermined distance from the current vehicle position (Step S57: YES), the processing ECU 100 may cause the process to proceed to Step S58. In contrast, if it is determined that there is no intersection within the predetermined distance from the current vehicle position (Step S57: NO), the ECU may cause the process to proceed to Step S59.

If it is determined that there is an intersection within the predetermined distance from the current vehicle position (Step S57: YES), the processing ECU 100 may set a deceleration correction value A (Step S58).

For example, if it is determined that there is an intersection in front of the vehicle, the processing ECU 100 may determine that the pedestrian or cyclist is to decelerate or stop, and set the deceleration correction value A within a predetermined correction coefficient range. Herein, the deceleration correction value A may be a correction coefficient used to correct the predicted vector Y0 of the pedestrian or cyclist into the predicted vector Y1. The deceleration correction value A may be a fixed value preliminarily determined or a variable value depending on the position of the intersection (i.e., the distance from the current vehicle position to the intersection).

After setting the deceleration correction value A (Step S58) or when determining that there is no intersection within the predetermined distance (Step S57: NO), the processing ECU 100 may determine whether the gradient from the current vehicle position toward the future traveling course indicated by the predicted vector Y0 is greater than or equal to a predetermined gradient rate (hereinafter referred to as a first gradient rate) (Step S59). The first gradient rate may be plus several tens of percentage points, for example.

For instance, the processing ECU 100 may determine whether the gradient from the current vehicle position toward the future traveling course indicated by the predicted vector Y0 is greater than or equal to the first gradient rate with reference to the surrounding geographical information. Alternatively, the information on the gradient may be acquired by the gyrosensor 32, for example, instead of by referring to the surrounding geographic information. In some cases, the gyrosensor 32 may acquire more accurate gradient information because of its real-time detection.

If it is determined that the gradient from the current vehicle position toward the future traveling course indicated by the predicted vector Y0 is greater than or equal to the first gradient rate (Step S59: YES), the processing ECU 100 may cause the process to proceed to Step S60. In contrast, if it is determined that the gradient from the current vehicle position toward the future traveling course indicated by the predicted vector Y0 is less than the first gradient rate (Step S59: NO), the processing ECU 100 may cause the process to proceed to Step S61.

If it is determined that the gradient from the current vehicle position toward the future traveling course indicated by the predicted vector Y0 is greater than or equal to the first gradient rate (Step S59: YES), the processing ECU 100 may set a deceleration correction value B (Step S60).

For example, if the gradient from the current vehicle position toward the future traveling course indicated by the predicted vector Y0 is greater than or equal to the first gradient rate, the processing ECU 100 may determine that the pedestrian or cyclist is to decelerate due to the upslope, and set the deceleration correction value B. Herein, the deceleration correction value B may be a correction coefficient used to correct the predicted vector Y0 of the pedestrian or cyclist into the predicted vector Y1, as is the case with the deceleration correction value A. The deceleration correction value B may be a fixed value preliminarily determined or a variable value depending on the gradient rate.

After setting the deceleration correction value B (Step S60) or when determining that the gradient from the current vehicle position toward the future traveling course indicated by the predicted vector Y0 is less than the first gradient rate (Step S59: NO), the processing ECU 100 may determine whether the gradient from the current vehicle position toward the future traveling course indicated by the predicted vector Y0 is less than or equal to another predetermined gradient rate (hereinafter referred to as a second gradient rate) (Step S61). The second gradient rate may be minus several tens of percentage points, for example.

For instance, the processing ECU 100 may determine whether the gradient from the current vehicle position toward the future traveling course indicated by the predicted vector Y0 is less than or equal to the second gradient rate with reference to the surrounding geographical information. Alternatively, the information on the gradient may be acquired by the gyrosensor 32, for example, instead of by referring to the surrounding geographic information, as described above.

If it is determined that the gradient from the current vehicle position toward the future traveling course indicated by the predicted vector Y0 is less than or equal to the second gradient rate (Step S61: YES), the processing ECU 100 may cause the process to proceed to Step S62. In contrast, if it is determined that the gradient from the current vehicle position toward the future traveling course indicated by the predicted vector Y0 is greater than the second gradient rate (Step S61: NO), the processing ECU 100 may cause the process to proceed to Step S63.

If it is determined that the gradient from the current vehicle position toward the future traveling course indicated by the predicted vector Y0 is less than or equal to the second gradient rate (Step S61: YES), the processing ECU 100 may set an acceleration correction value C (Step S62).

For example, if the gradient from the current vehicle position toward the future traveling course indicated by the predicted vector Y0 is less than or equal to the second gradient rate, the processing ECU 100 may determine that the pedestrian or cyclist is to accelerate due to the downslope, and set the acceleration correction value C. Herein, the acceleration correction value C may be a correction coefficient used to correct the predicted vector Y0 of the pedestrian or cyclist into the predicted vector Y1, as are the cases with the deceleration correction value A and the deceleration correction value B. The acceleration correction value C may be a fixed value preliminarily determined or a variable value depending on the gradient rate, as is the case with the deceleration correction value B.

After setting the acceleration correction value C (Step S62) or when determining that the gradient from the current vehicle position toward the future traveling course indicated by the predicted vector Y0 is greater than the second gradient rate (Step S61: NO), the processing ECU 100 may perform a correction calculation process on the predicted vector Y0 (Step S63).

For example, the processing ECU 100 may correct the predicted vector Y0 of the pedestrian or cyclist into the predicted vector Y1 on the basis of the deceleration correction value A, the deceleration correction value B, and the acceleration correction value C determined from the surrounding geographical information. An example expression used by the processing ECU 100 to calculate the predicted vector Y1 of the pedestrian or cyclist may be as follows:

$$Y1=Y0*(1+A+B+C)$$

where A, B, and C denote respective acceleration correction values. That is, A and B respectively denote the inverse of the deceleration correction value A and the inverse of the deceleration correction value B, and C denotes the acceleration correction value C.

Thereafter, the processing ECU 100 may calculate a predicted vector Y2 indicating a future traveling course of the vehicle on the basis of the vehicle traveling information (Step S64). For example, the processing ECU 100 may calculate the predicted vector Y2 of the vehicle on the basis of the vehicle speed acquired by the VDC 33 and/or the steering angle acquired by the EPS 34, for example.

Thereafter, the processing ECU 100 may estimate the TTC on the basis of the predicted vector Y1 of the pedestrian or cyclist and the predicted vector Y2 of the vehicle (Step S65), and end the post-detection TTC calculation process. If it is determined that no GPS information has been acquired (Step S54: NO), the processing ECU 100 may use the predicted vector Y0 set in Step S55 as the predicted vector Y1.

According to the contact detection notification apparatus including the surrounding moving object detector of the foregoing example embodiment, the future traveling course of the vehicle (the predicted vector Y2) calculated on the basis of the traveling information on the vehicle is compared with the future traveling course of the pedestrian or cyclist (the predicted vector Y0 or Y1) calculated on the basis of the surrounding object information to calculate the possibility of contact between the vehicle and the pedestrian or cyclist. On the basis of the possibility of contact calculated, the determination threshold for determining an occurrence of contact is changed, and contact between the vehicle and the pedestrian or cyclist is detected using the determination threshold changed. Accordingly, it is possible to determine an occurrence of contact between different types of objects depending on the situation while reducing erroneous detection of contact.

Further, according to the contact detection notification apparatus 1 of the foregoing example embodiment, when the sight of the pedestrian or cyclist is lost because of being hidden by an obstacle, the future traveling course of the detected pedestrian or cyclist may be corrected and the possibility of contact between the pedestrian or cyclist and the vehicle may be calculated on the basis of the surrounding geographical information. Accordingly, it is possible to estimate the traveling direction and speed of a moving object and assess the possibility of contact even if the moving object is hidden by an obstacle.

In one embodiment, the GPS 31, the VDC 33, the EPS 34, and the direction indicator 35 may serve as a "vehicle traveling information acquiring unit". In one embodiment, the contact detection sensor 20 may serve as a "contact detection unit". In one embodiment, the object detection radar 10 may serve as a "surrounding object information acquiring unit". In one embodiment, the processing ECU 100 may serve as a "traveling course prediction processor", a "contact possibility calculation processor", a "determination threshold changing processor", and a "surrounding geographical information acquiring processor".

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

The processing ECU 100 in the contact detection notification apparatus 1 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processing ECU 100. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the processing ECU 100 in the contact detection notification apparatus 1 illustrated in FIG. 1.

The invention claimed is:

1. A surrounding moving object detector for a vehicle comprising:
    a vehicle traveling information acquiring sensor configured to acquire vehicle traveling information including data on a traveling position of the vehicle;
    a contact sensor configured to detect a first contact between the vehicle and another object when an output value from a sensor installed in the vehicle is greater than a first threshold, wherein the first threshold is a default threshold, and wherein the first contact requires use of an airbag to protect an occupant of the vehicle;
    a surrounding object detection radar configured to acquire surrounding object information on objects present around the traveling position;
    a relative speed detection processor configured to detect a relative speed between the vehicle and a moving object present around the traveling position detected on a basis of the surrounding object information, wherein the moving object is a pedestrian or cyclist;
    a determination threshold changing processor configured to:
        change the first threshold to a second threshold less than the first threshold in response to the relative speed being greater than or equal to a threshold speed, wherein the second threshold is set to a current threshold; and
        change the first threshold to a third threshold less than the second threshold in response to the relative speed being less than the threshold speed, wherein the third threshold is set to the current threshold;
    a traveling course prediction processor configured to calculate a future traveling course of the vehicle on a basis of the vehicle traveling information and calculate a future traveling course of the moving object; and
    a contact possibility calculation processor configured to calculate an estimated time-to-contact between the vehicle and the moving object on a basis of the future traveling course of the vehicle and the future traveling course of the moving object, wherein the estimated time-to-contact is an estimated time until the vehicle contacts the moving object,
    wherein the determination threshold changing processor is further configured to:
        change the current threshold that is the second or third threshold to a fourth threshold less than the third threshold in response to the estimated time-to-contact being equal to or shorter than a first reference time, wherein the fourth threshold is set to the current threshold;
        maintain the current threshold in response to the estimated time-to-contact being longer than the first reference time, and shorter than a second reference time that is longer than the first reference time; and
        change the current threshold to the first threshold in response to the estimated time-to-contact being equal to or longer than the second reference time, wherein the first threshold is set to the current threshold, and
    wherein the contact sensor is configured to detect the contact between the vehicle and the another object when the output value from the sensor is greater than the current threshold.

2. The surrounding moving object detector according to claim 1, further comprising
    a surrounding geographical information acquiring processor configured to acquire surrounding geographical information on geography around the traveling position, wherein,
    when sight of the moving object detected by the surrounding object detection radar is lost, the traveling course prediction processor is configured to correct the future traveling course of the moving object on a basis of the surrounding geographical information acquired by the surrounding geographical information acquiring processor.

3. A surrounding moving object detector for a vehicle comprising circuitry configured to:
    acquire vehicle traveling information including data on a traveling position of the vehicle;
    acquire contact information on a first contact between the vehicle and another object when an output value from a sensor installed in the vehicle is greater than a first threshold, wherein the first threshold is a default threshold, and wherein the first contact requires use of an airbag to protect an occupant of the vehicle;
    acquire surrounding object information on objects present around the traveling position;
    detect a relative speed between the vehicle and a moving object present around the traveling position on a basis of the surrounding object information, wherein the moving object is a pedestrian or cyclist;
    change the first threshold to:
        a second threshold less than the first threshold in response to the relative speed being greater than or equal to a threshold speed, wherein the second threshold is set to a current threshold; and
        a third threshold less than the second threshold in response to the relative speed being less than the threshold speed, wherein the third threshold is set to the current threshold;
    calculate a future traveling course of the vehicle on a basis of the vehicle traveling information and calculate a future traveling course of the moving object;
    calculate an estimated time-to-contact between the vehicle and the moving object on a basis of the future traveling course of the vehicle and the future traveling course of the moving object, wherein the estimated time-to-contact is an estimated time until the vehicle contacts the moving object;
    change the current threshold that is the second or third threshold to a fourth threshold less than the third threshold in response to the estimated time-to-contact being equal to or shorter than a first reference time, wherein the fourth threshold is set to the current threshold;
    maintain the current threshold in response to the estimated time-to-contact being longer than the first reference time, and shorter than a second reference time that is longer than the first reference time;
    change the current threshold to the first threshold in response to the estimated time-to-contact being equal to or longer than the second reference time, wherein the first threshold is set to the current threshold; and
    detect the contact between the vehicle and the another object when the output value from the sensor is greater than the current threshold.

* * * * *